United States Patent
Liu et al.

(10) Patent No.: US 12,380,318 B2
(45) Date of Patent: Aug. 5, 2025

(54) SEMI-SUPERVISED HYPERSPECTRAL DATA QUANTITATIVE ANALYSIS METHOD BASED ON GENERATIVE ADVERSARIAL NETWORK

(71) Applicant: Institute of Intelligent Manufacturing, Guangdong Academy of Sciences, Guangdong (CN)

(72) Inventors: Yisen Liu, Guangdong (CN); Songbin Zhou, Guangdong (CN); Chang Li, Guangdong (CN); Wei Han, Guangdong (CN); Kejia Huang, Guangdong (CN); Weixin Liu, Guangdong (CN); Zefan Qiu, Guangdong (CN)

(73) Assignee: Institute of Intelligent Manufacturing, Guangdong Academy of Sciences, Guangzhou (CN)

( * ) Notice: Subject to any disclaimer, the term of this patent is extended or adjusted under 35 U.S.C. 154(b) by 998 days.

(21) Appl. No.: 17/438,460

(22) PCT Filed: Mar. 17, 2020

(86) PCT No.: PCT/CN2020/079710
§ 371 (c)(1),
(2) Date: Sep. 12, 2021

(87) PCT Pub. No.: WO2020/233207
PCT Pub. Date: Nov. 26, 2020

(65) Prior Publication Data
US 2022/0129735 A1    Apr. 28, 2022

(30) Foreign Application Priority Data
May 20, 2019 (CN) .......................... 201910420079.6

(51) Int. Cl.
*G06N 3/045* (2023.01)
*G01N 21/25* (2006.01)
(Continued)

(52) U.S. Cl.
CPC ............. *G06N 3/045* (2023.01); *G01N 21/25* (2013.01); *G06N 3/048* (2023.01); *G06N 3/088* (2013.01)

(58) Field of Classification Search
CPC ........ G06N 3/045; G06N 3/048; G06N 3/088; G01N 21/25; G01N 21/359; G06F 18/2135; G06F 18/241
See application file for complete search history.

(56) References Cited

U.S. PATENT DOCUMENTS

2008/0123097 A1 * 5/2008 Muhammed .......... G01J 3/0294
356/419
2018/0373958 A1 * 12/2018 Patel ....................... G06T 7/174
(Continued)

FOREIGN PATENT DOCUMENTS

| CN | 108764173 A | 11/2018 |
| CN | 109102029 A | 12/2018 |

(Continued)

OTHER PUBLICATIONS

He, Zhi, et al. "Generative adversarial networks-based semi-supervised learning for hyperspectral image classification." Remote Sensing 9.10 (2017), pp. 1-27. (Year: 2017).*
(Continued)

*Primary Examiner* — Omar F Fernandez Rivas
*Assistant Examiner* — Michael C. Lee (57) ABSTRACT

Disclosed is a hyperspectral data analysis method based on a semi-supervised learning strategy, which includes: hyperspectral sample data is acquired; a sample training set and a prediction set are constructed, herein an unlabeled predic-
(Continued)

tion set sample is used; a regression network based on a generative adversarial network is constructed, including a generator network that generates a sample, and a discriminator/regressor network that has functions of judging the authenticity of the sample and outputting a quantitative analysis value at the same time; a loss function of the generative adversarial network is constructed, including a loss function of the discriminator, a loss function of the regressor, and a loss function of the generator with a sample distribution matching function. The generative adversarial network is used to generate a sample. A sample distribution matching strategy is used to supplement an existing unlabeled sample set. So, the accuracy of hyperspectral quantitative analysis is improved.

6 Claims, 4 Drawing Sheets

(51) Int. Cl.
　　*G06N 3/048*　　　(2023.01)
　　*G06N 3/088*　　　(2023.01)

(56) References Cited

U.S. PATENT DOCUMENTS

| | | | |
|---|---|---|---|
| 2019/0083728 A1* | 3/2019 | Nawn | A61M 16/0488 |
| 2019/0122072 A1* | 4/2019 | Cricrì | G06V 20/46 |
| 2019/0198156 A1* | 6/2019 | Madani | G06N 3/082 |
| 2019/0251713 A1* | 8/2019 | Chen | A61B 6/482 |

FOREIGN PATENT DOCUMENTS

| | | |
|---|---|---|
| CN | 109145992 A | 1/2019 |
| CN | 109615632 A | 4/2019 |
| WO | 2018209894 A1 | 11/2018 |

OTHER PUBLICATIONS

Zhan, Ying, et al. "Semi-supervised classification of hyperspectral data based on generative adversarial networks and neighborhood majority voting." IEEE, 2018, pp. 5756-5759 (Year: 2018).*
Zhan, Ying, et al. "Semisupervised hyperspectral image classification based on generative adversarial networks." IEEE Geoscience and Remote Sensing Letters 15.2 (2018): 212-216. (Year: 2018).*
Zhu, Lin, et al. "Generative adversarial networks for hyperspectral image classification." IEEE Transactions on Geoscience and Remote Sensing 56.9 (2018): 5046-5063 (Year: 2018).*
Olmschenk, et al. "Generalizing semi-supervised generative adversarial networks to regression using feature contrasting." arXiv preprint arXiv:1811.11269 (Feb. 19, 2019) (Year: 2019).*
Zhong, Zilong, et al. "Generative Adversarial Networks and Conditional Random Fields for Hyperspectral Image Classification." arXiv preprint arXiv:1905.04621 (May 12, 2019), pp. 1-14. (Year: 2019).*
Zhi He et al., Generative Adversarial Networks-Based Semi-Supervised Learning for Hyperspectral Image Classification, remote sensing, Oct. 12, 2017, pp. 1-27, vol. 9, No. 1042.
International Search Report of PCT Patent Application No. PCT/CN2020/079710 issued on Jun. 22, 2020.

* cited by examiner

SEMI-SUPERVISED HYPERSPECTRAL DATA QUANTITATIVE ANALYSIS METHOD BASED ON GENERATIVE ADVERSARIAL NETWORK

TECHNICAL FIELD

The present invention belongs to the technical field of hyperspectral nondestructive testing. Specifically, it relates to a semi-supervised hyperspectral data quantitative analysis method based on a generative adversarial network.

BACKGROUND

A hyperspectral-based quantitative analysis technology has a wide range of application scenarios, including food adulteration detection, fruit sugar content detection, microbiological content detection, organic matter content detection and the like. Commonly used hyperspectral quantitative analysis algorithms include Partial Least Squares Regression (PLSR), Least Squares Support Vector Machine (LS-SVM), Multiple Linear Regression (MLR), and other methods. However, the model accuracy and model robustness of the quantitative analysis algorithms are still needed to be further improved. Especially in the actual application scenarios, there are unbalanced label samples, or there are few label samples and the like, the difficulty of modeling is further increased.

At present, although a convolutional neural network is already proven to have a powerful ability to analyze complex information, and the convolutional network is well applied in a classification application of remote sensing hyperspectral data. However, the application thereof in the quantitative analysis of the hyperspectral data still has greater difficulty. The main reason is that in practical applications, a hyperspectral data sample, especially a calibrated sample, is difficult to obtain, and a small sample size brings a very large risk of overfitting.

Xidian University, in invention patent documents "hyperspectral image classification method based on multi-class generative adversarial network" (application number: 201810548520.4) and "hyperspectral image classification method united with collaborative generative adversarial network and space spectrum" (application number: 201810977887.8), uses the Generative Adversarial Network (GAN) to generate a spectral curve sample, thereby an overfitting phenomenon is alleviated, and the classification accuracy of the hyperspectral data is improved. However, the above document methods are all developed for a problem of the hyperspectral data classification, and it is still difficult to use the generative adversarial network to perform the quantitative analysis of the hyperspectral data. Firstly, unlike a discrete label of the classification problem, a label value in the quantitative analysis is a continuous analog quantity, so a network structure design may not be equal to the semi-supervised classification problem, and it is impossible to use a k+1 class or k classification adversarial network to achieve regression; and secondly, in the classification problem, generated data is mainly used to assist determine a boundary value of the classification, and in the regression problem, the generated data needs to be used to smooth sample quantitative value distribution. Therefore, it is necessary to design a new network structure and a loss function to achieve the semi-supervised hyperspectral data quantitative analysis based on the generative adversarial network. Thereby the accuracy of the analysis is improved.

SUMMARY

In view of the above disadvantages of the existing technology, the present invention provides a semi-supervised hyperspectral data quantitative analysis method based on a generative adversarial network. The method is capable of, by a generative adversarial network, generating a spectrum sample, and using the generated sample to achieve a purpose of enhancing the continuity of sample distribution and suppressing overfitting, thereby improving the accuracy of quantitative analysis of hyperspectral data.

The present invention solves the above problems through the following technical means.

A semi-supervised hyperspectral data quantitative analysis method based on a generative adversarial network, which constructs the generative adversarial network for quantitative analysis, herein a generator is used to generate a sample, and a discriminator is used to distinguish the authenticity of the samples, and output a quantitative analysis result at the same time. The method includes the following steps.

Labeled hyperspectral sample data and unlabeled hyperspectral sample data are acquired.

A sample training set and a prediction set are constructed:

The labeled sample is used as a training set sample, and the unlabeled sample is used as a prediction set sample, and also used for semi-supervised training; and A mean value of a spectral curve of n effective pixels is randomly taken by m times in a hyperspectral sample data block of each training set and prediction set, as sample enhancement, and obtained labeled and unlabeled average spectral data sets are marked as $D_{label}$ and $D_{unlabel}$.

A regression network based on the generative adversarial network is constructed:

A generator network is constructed, and the network sequentially consists of: fully connected layer-upsampling layer-convolutional layer-upsampling layer-convolutional layer-output layer, herein the number of nodes in the fully connected layer is 16*the number of spectral wavebands, the convolutional layer is one-dimensional convolution, the size of a convolution kernel is 1×5, a value range of the number of the convolution kernels is 16~128, the upsampling layer is 2 times of upsampling, the number of nodes in the output layer is the same as the number of the spectral wavebands, except for the output layer, a nonlinear excitation function is ReLU, and output layer nonlinear excitation is a sigmoid function.

A discriminator/regressor network is constructed, and the network sequentially consists of: convolutional layer-pooling layer-convolutional layer-pooling layer-convolutional layer-pooling layer-output layer, herein the convolutional layer is one-dimensional convolution, the size of a convolution kernel is 1×5, a value range of the number of the convolution kernels is 16~128, the pooling layer is ½ downsampling, there are 2 output layers, one of which outputs a result of the discriminator, namely the spectral data authenticity prediction value, and the other outputs a result of the regressor, namely the quantitative analysis prediction value, except for the output layer, a nonlinear excitation function is leakyReLU, and nonlinear excitation of the two output layers is a sigmoid function.

A loss function of the generative adversarial regression network is constructed:

the loss function of the discriminator/regressor is the sum of loss functions of a labeled sample and an unlabeled sample, herein the loss function of the unlabeled sample is the sum of a loss function of a real unlabeled sample ($L_{unlabel\_real}$) and a loss function of a generated sample ($L_{unlabel\_fake}$):

$$L_D = L_{supervised} + L_{unsupervised}$$

$$L_{unsupervised} = L_{unlabel\_real} + L_{unlabel\_fake}$$

Herein the label sample loss function is a regression loss function, namely a mean square error of the quantitative analysis prediction value of the labeled sample and the quantitative label value:

$$L_{supervised} = \|z_{label} - \hat{z}_{label}\|_2$$

The unlabeled sample loss function is a cross entropy of a discriminator prediction value and an authenticity label:

$$L_{unlabel\_real} = -0.5 * \sum_i y^i_{unlabel} \log(\hat{y}^i_{unlabel})$$

The generated sample loss function is a cross entropy of a discriminator prediction value and an authenticity label:

$$L_{unlabel\_fake} = -0.5 * \Sigma_i y^i_{fake} \log(\hat{y}^i_{fake})$$

A loss function of the generator is the sum of the loss function of the generated sample and a sample distribution matching loss function:

$$L_G = L'_{unlabel\_fake} + L_{distribution}$$

Herein, the loss function of the generated sample ($L'_{unlabel\_fake}$) is the cross entropy of the prediction value of the generator generated sample by the discriminator and the authenticity label, and the generator is opposite to the authenticity label of the generated sample in the discriminator, so that the generator and the discriminator are opposed:

$$L'_{unlabel\_fake} = -\sum_i \tilde{y}^i_{fake} \log(\hat{y}^i_{fake})$$

The sample distribution matching loss function ($L_{distribution}$) is a mean square error of the unlabeled sample and generated sample quantitative analysis value distribution predicted by the regressor:

$$L_{distribution} = \|\hat{p}_{unlabel}(z) - \hat{p}_{fake}(z)\|_2$$

Herein $\hat{p}_{unlabel}(z)$ is the quantitative analysis value distribution of the unlabeled samples predicted by the regressor, and $\hat{p}_{fake}(z)$ is the quantitative analysis value distribution of the generated samples predicted by the regressor. Calculating steps of $\hat{p}_{unlabel}(z)$ and $\hat{p}_{fake}(z)$ are as follows:

The quantitative analysis values of the unlabeled samples and the generated samples of an existing training batch are predicted by the regressor, which are $\hat{z}^i_{unlabel}$ and $\hat{z}^i_{fake}$, respectively.

The distribution of the sample quantitative analysis values is approximated to multinomial distribution of k items, $\hat{z}^i_{unlabel}$ and $\hat{z}^i_{fake}$ are approximated to k levels, and then probability distribution $\hat{p}_{unlabel}(z)$ and $\hat{p}_{fake}(z)$ is obtained by counting.

The sample distribution loss function exists to reduce the similarity of the quantitative analysis value distributions of the existing sample and the generated sample, so that the generated sample becomes a supplement to the existing unlabeled sample.

The generative adversarial regression network is trained.

A gradient descent method is adopted to alternately train the discriminator/regressor and the generator, until a root mean square error of a quantitative analysis prediction value of a training set sample and a label value is converged to be less than a threshold or the number of training steps is greater than a threshold.

The regressor in the trained generative adversarial network is used to obtain the quantitative analysis prediction value of the prediction set.

Compared with an existing technology, the present invention has the following advantages.

The present invention uses the generative adversarial network to generate samples, uses a sample distribution matching strategy to supplement an existing unlabeled sample set, and uses the generated sample matched with the distribution to achieve a similar regularization effect to the regressor, thereby a problem that deep learning easily produces the overfitting in the quantitative analysis is overcome, and the accuracy of the hyperspectral quantitative analysis is improved.

BRIEF DESCRIPTION OF THE DRAWINGS

In order to explain technical schemes in embodiments of the present invention more clearly, drawings used in descriptions of the embodiments are briefly introduced below. It is apparent that the drawings in the following descriptions are only some embodiments of the present invention, and other drawings may be acquired by those of ordinary skill in the art without creative work according to these drawings.

FIG. 2 (a) is a scatter diagram of a real value and a prediction value of a tablet effective ingredient obtained by using a Partial Least Squares Regression (PLSR).

FIG. 2 (b) is a scatter diagram of a real value and a prediction value of a tablet effective ingredient obtained by directly using a Convolutional Network (CNN) without using a generative adversarial network.

FIG. 2 (c) is a scatter diagram of a real value and a prediction value of a tablet effective ingredient obtained by using the method of the present invention.

DETAILED DESCRIPTION OF THE EMBODIMENTS

In order to make the above purposes, features, and advantages of the present invention more apparent and understandable, technical schemes of the present invention are described in detail below with reference to drawings and specific embodiments. It should be pointed out that the described embodiments are only a part of the embodiments of the present invention rather than all of the embodiments. Based on the embodiments of the present invention, all of the other embodiments obtained by those of ordinary skill in the art without creative work shall fall within a scope of protection of the present invention.

Figure 1:
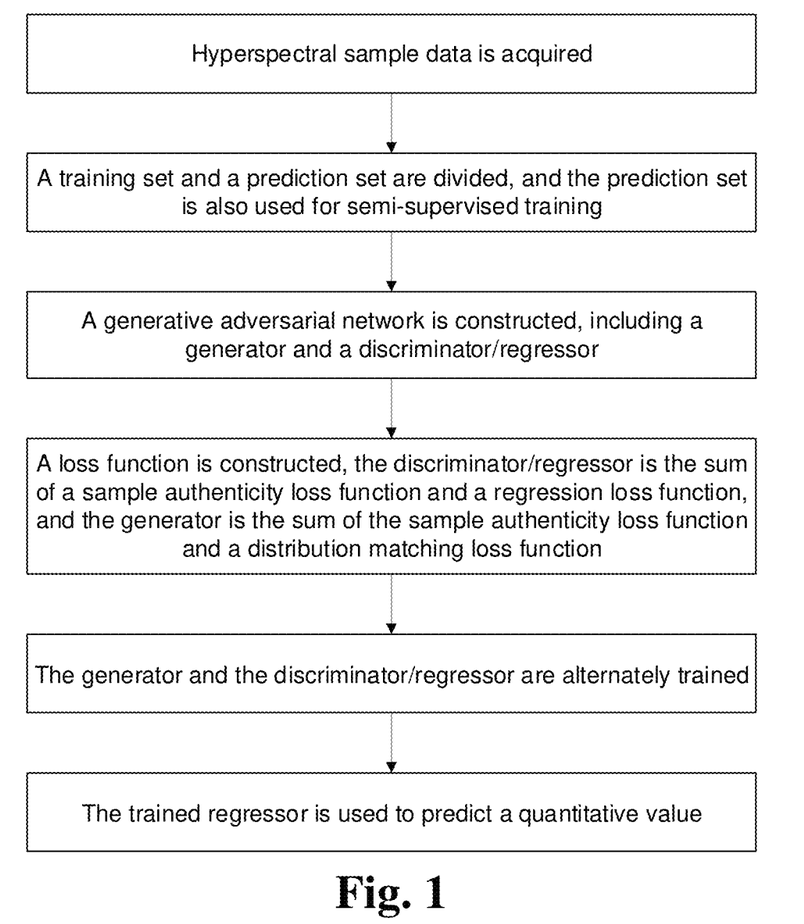
FIG. 1 is a flow diagram of the present invention.

This embodiment uses hyperspectral measurement to determine the active ingredients of a paracetamol tablet. As shown in FIG. 1, a semi-supervised hyperspectral data quantitative analysis method based on a generative adversarial network includes the following specific steps:

Hyperspectral image data of a total of 437 paracetamol tablets is measured, herein the content of the active ingredient (paracetamol) is 0%~90% w/w, the interval is 5% w/w, there are 19 levels in total, and 23 samples per level. A hyperspectral waveband is 900-1700 nm, herein 100 nm before and after is removed due to a high noise, and a total of 180 wavebands from 1000-1600 nm are used for data analysis.

A sample training set and a prediction set are constructed:

10 samples are randomly taken as the training set, namely 10 labeled samples, and the remaining 427 samples are used as the prediction set to evaluate the accuracy of a model, and also used as unlabeled samples for semi-supervised training.

An average value of spectral curves of 100 effective pixels is randomly taken by 10 times in a hyperspectral sample data block of each training set and prediction set, as sample enhancement, and obtained labeled and unlabeled average spectral data sets are marked as $D_{label}$ and $D_{unlabel}$.

A regression network based on the generative adversarial network is constructed:

A generator network is constructed, and the network sequentially consists of: fully connected layer-upsampling layer-convolutional layer-upsampling layer-convolutional layer-output layer, herein the number of nodes in the fully connected layer is 64*45, the convolutional layer is one-dimensional convolution, the size of a convolution kernel is 1×5, the number of the convolution kernels is 64, the upsampling layer is 2 times of upsampling, the number of nodes in the output layer is 180, except for the output layer, a nonlinear excitation function is ReLU, and output layer nonlinear excitation is a sigmoid function.

A discriminator/regressor network is constructed, and the network sequentially consists of: convolutional layer-pooling layer-convolutional layer-pooling layer-convolutional layer-pooling layer-output layer, herein the convolutional layer is one-dimensional convolution, the size of a convolution kernel is 1×5, the number of the convolution kernels is 16, the pooling layer is ½ downsampling, there are 2 output layers, one of which outputs a result of the discriminator, namely the spectral data authenticity label, and the other outputs a result of the regressor, namely the effective ingredient content value, except for the output layer, a nonlinear excitation function is leakyReLU, and nonlinear excitation of the two output layers is a sigmoid function.

A loss function of the generative adversarial regression network is constructed.

The loss function of the discriminator/regressor is the sum of loss functions of a labeled sample and an unlabeled sample, herein the loss function of the unlabeled sample is the sum of a loss function of a real unlabeled sample and a loss function of a generated sample:

$$L_D = L_{supervised} + L_{unsupervised}$$

$$L_{unsupervised} = L_{unlabel\_real} + L_{unlabel\_fake}$$

Herein the label sample loss function is a mean square error of the effective ingredient prediction value of the labeled sample and the effective ingredient label value:

$$L_{supervised} = \|z_{label} - \hat{z}_{label}\|_2$$

The unlabeled sample loss function is a cross entropy of a discriminator prediction value and an authenticity label:

$$L_{unlabel\_real} = -0.5 * \sum_i y^i_{unlabel} \log(\hat{y}^i_{unlabel})$$

The generated sample loss function is a cross entropy of a discriminator prediction value and an authenticity label:

$$L_{unlabel\_fake} = -0.5 * \Sigma_i y^i_{fake} \log(\hat{y}^i_{fake})$$

A loss function of the generator is the sum of the loss function of the generated sample and a sample distribution matching loss function:

$$L_G = L'_{unlabel\_fake} + L_{distribution}$$

Herein, the loss function of the generated sample ($L'_{unlabel\_fake}$) is the cross entropy of the prediction value of the generator generated sample by the discriminator and the authenticity label, herein the discriminator is opposite to the generated sample authenticity label of the generator, thus a confrontation is formed:

$$L'_{unlabel\_fake} = -\sum_i \tilde{y}^i_{fake} \log(\hat{y}^i_{fake})$$

The sample distribution matching loss function ($L_{distribution}$) is a mean square error of the unlabeled sample and generated sample quantitative analysis value distribution predicted by the regressor:

$$L_{distribution} = \|\hat{p}_{unlabel}(z) - \hat{p}_{fake}(z)\|_2$$

Herein $\hat{p}_{unlabel}(z)$ is the quantitative analysis value distribution of the unlabeled samples predicted by the regressor, and $\hat{p}_{fake}(z)$ is the quantitative analysis value distribution of the generated samples predicted by the regressor. A specific calculating method of $\hat{p}_{unlabel}(z)$ and $\hat{p}_{fake}(z)$ is as follows: the effective ingredient value of the sample is approximated to a 100-item multinomial distribution with a value of 0 to 1, and the unlabeled sample and generated sample quantitative analysis values $\hat{z}^i_{unlabel}$ and $\hat{z}^i_{fake}$ of an existing training batch predicted by the regressor are approximated to the above 100 levels, and $\hat{p}_{unlabel}(z)$ and $\hat{p}_{fake}(z)$ is obtained by sample counting statistics.

The generative adversarial regression network is trained.

A gradient descent method is adopted to alternately train the discriminator/regressor and the generator, an optimizer adopts an "Adam" optimizer, the learning rate is 0.0005, and it is stopped while the number of training steps reaches 1000.

The regressor in the trained generative adversarial network is used to obtain the tablet effective ingredient prediction value of the prediction set.

Figure 2A:
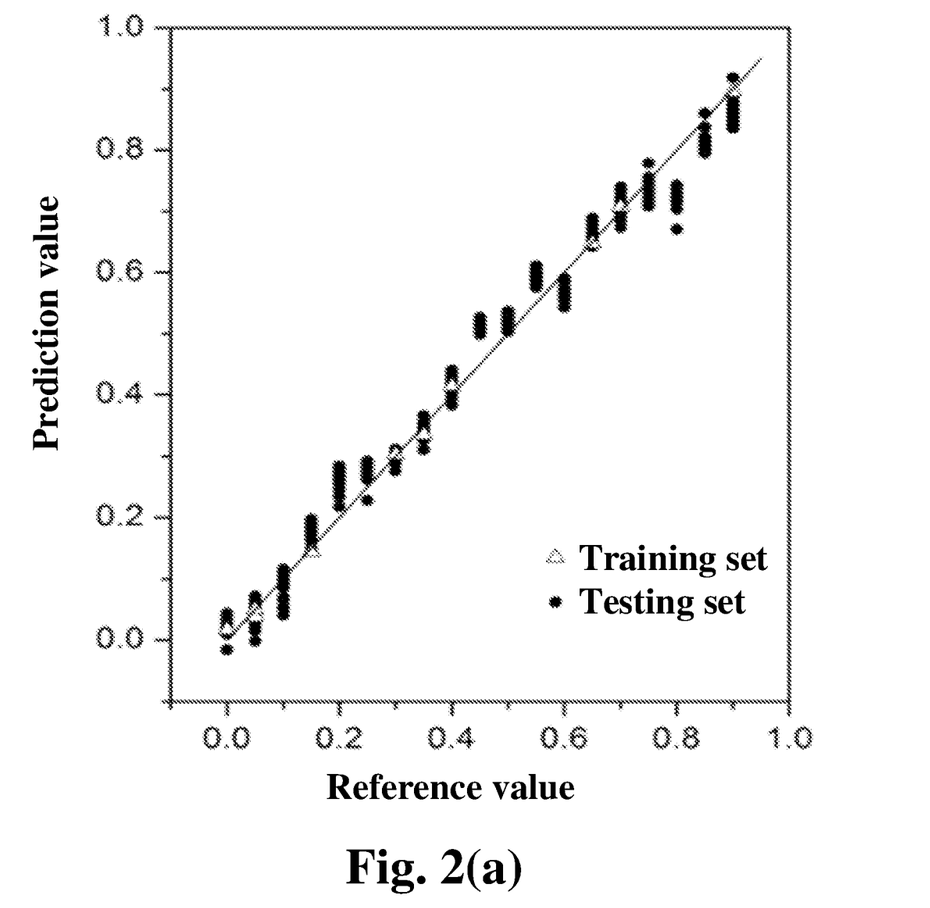
Figure 2B:
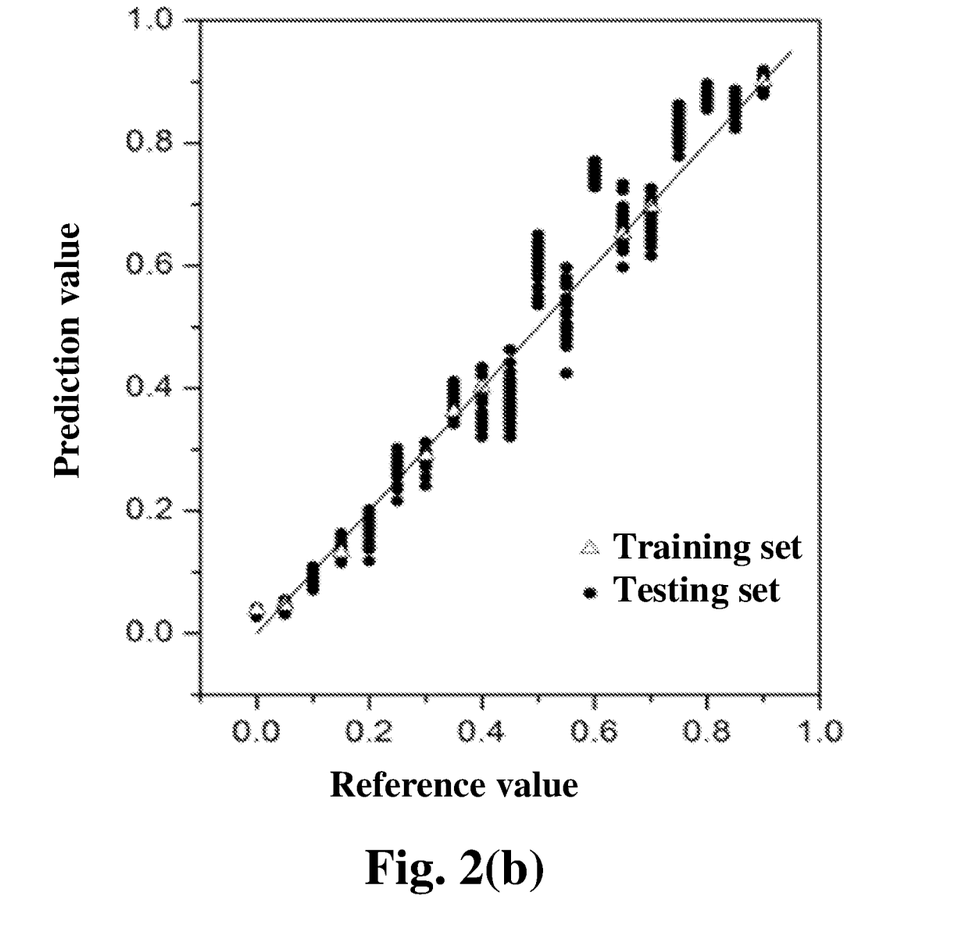
Figure 2C:
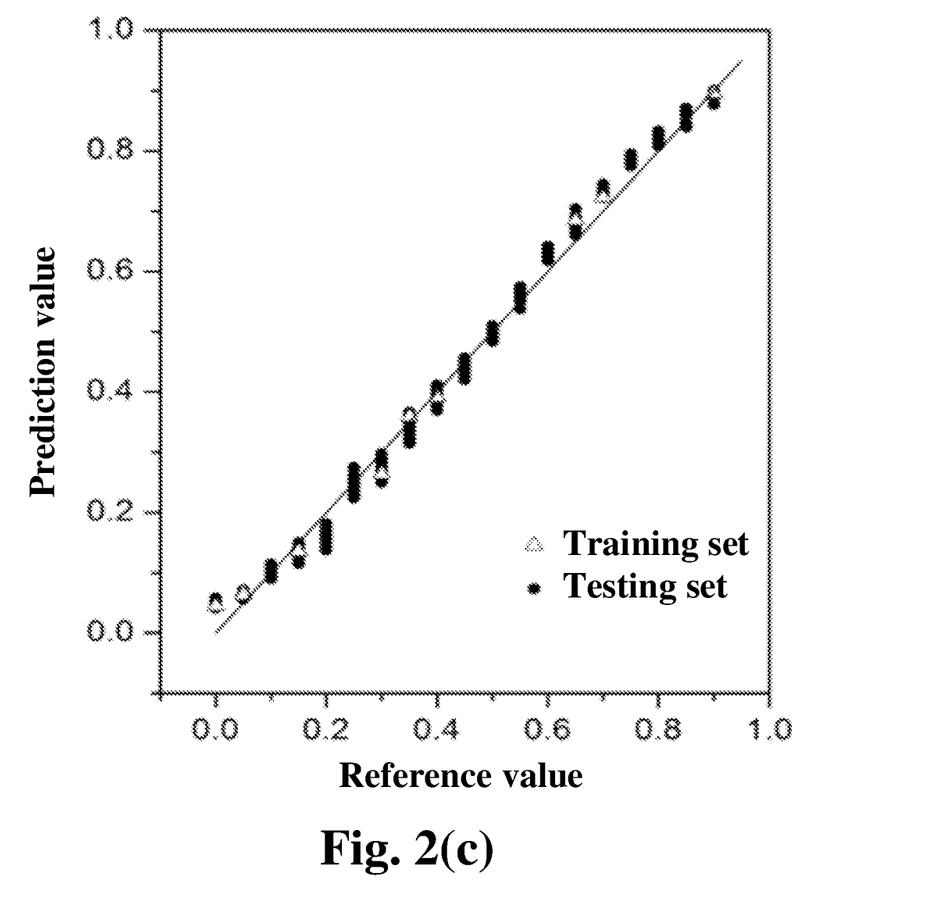

The training set and the prediction set are randomly sampled by 10 times for calculation, and the PLSR and CNN are used as a comparison method for calculation. In the PLSR method, the number of principal ingredients is determined by ten-fold cross-validation, and parameters of the CNN are consistent with the regressor in the method of the present invention. Results of 10 times of the calculation are as follows: a Root Mean Square Error of Calibration (RMSEC) of the training set obtained by the partial least square method is 1.01±0.46%, and a Root Mean Square Error of Prediction (RMSEP) of the prediction set is 3.79±1.06%; an RMSEC of the training set obtained by the CNN is 1.45±0.71%, and an RMSEP of the prediction set is 5.84±1.77%, and an RMSEC of the training set obtained by the method of the present invention is 2.42±0.49%, and an RMSEP of the prediction set is 2.56±0.88%. A scatter diagram of a real value and a prediction value calculated by randomly sampling once is shown in FIG. 2a-2c.

It may be seen from the calculation results that in the case of small samples, both the PLSR and CNN have apparent overfitting phenomena, and the accuracy of the prediction set is much lower than the accuracy of the training set. Since the method of the present invention adopts the generative adversarial-type network structure, the overfitting problem is well alleviated, and the accuracy of the prediction set is significantly improved.

The above embodiments only express several implementation modes of the present invention, and descriptions thereof are relatively specific and detailed, but it should not be understood as a limitation to a patent scope of the present invention. It should be pointed out that for those of ordinary skill in the art, a plurality of modifications and improvements may be made without departing from the concept of the present invention, and these all fall within a scope of protection of the present invention. Therefore, the scope of protection of the patent of the present invention should be subject to the appended claims.

What is claimed is:

1. A semi-supervised hyperspectral data quantitative analysis method based on a generative adversarial network, wherein it comprises the following steps:

acquiring labeled hyperspectral sample data and unlabeled hyperspectral sample data;

constructing a sample training set and a prediction set: a labeled hyperspectral sample data set $D_{label}$ is used as the training set, and an unlabeled hyperspectral sample data set $D_{unlabel}$ is used as the prediction set;

constructing a regression network based on the generative adversarial network:

constructing a generator network consisting of a fully connected layer, a convolutional layer, an upsampling layer, and an output layer; and constructing a discriminator/regressor network consisting of a convolutional layer, a pooling layer, and an output layer, wherein the network has two outputs of judging data authenticity and a quantitative analysis value;

constructing a loss function of the regression network based on the generative adversarial network:

a loss function of the discriminator/regressor network is the sum of loss functions of a labeled sample and an unlabeled sample, wherein the loss function of the unlabeled sample is the sum of a loss function of a real unlabeled sample ($L_{unlabel\_real}$) and a loss function of a generated sample ($L_{unlabel\_fake}$):

$$L_D = L_{supervised} + L_{unsupervised}$$

$$L_{unsupervised} = L_{unlabel\_real} + L_{unlabel\_fake}$$

and a loss function of the generator network is the sum of the loss function of the generated sample ($L'_{unlabel\_fake}$) and a sample distribution matching loss function ($L_{distribution}$):

$$L_G = L'_{unlabel\_fake} + L_{distribution}$$

wherein, the sample distribution matching loss function is to make the generated sample and the real sample complement each other in a sample space, as to achieve the effect of suppressing overfitting;

training the regression network based on the generative adversarial network:

adopting a gradient descent method to alternately train the discriminator/regressor network and the generator network, until a root mean square error of a quantitative analysis prediction value of a training set sample and a label value is converged to be less than a threshold or the number of training steps is greater than a threshold; and using the discriminator/regressor network in the trained generative adversarial network to obtain a quantitative analysis prediction value of the prediction set;

wherein the generator network sequentially consists of: fully connected layer-upsampling layer-convolutional layer-upsampling layer-convolutional layer-output layer, wherein the number of nodes in the fully connected layer is 16*a predetermined number of spectral wavebands, the convolutional layer is one-dimensional convolution, the size of a convolution kernel is 1×5, the number of the convolutional kernels is within the range of 16-128, inclusive, the upsampling layer upsamples the samples so that there are now twice as many samples, the number of nodes in the output layer is the same as the predetermined number of the spectral wavebands, except for the output layer, a nonlinear excitation function is ReLU, and output layer nonlinear excitation is a sigmoid function.

2. The semi-supervised hyperspectral data quantitative analysis method based on the generative adversarial network as claimed in claim 1, wherein the step of constructing a sample training set and a prediction set comprises:

using the labeled sample as a training set sample, and using the unlabeled sample as a prediction set sample, which is also used for semi-supervised training; and taking a mean value of a spectral curve of n effective pixels is randomly taken by m times in a hyperspectral sample data block of each training set and prediction set, as sample enhancement, and obtained labeled and unlabeled average spectral data sets are marked as $D_{label}$ and $D_{unlabel}$.

3. The semi-supervised hyperspectral data quantitative analysis method based on the generative adversarial network as claimed in claim 1, wherein the discriminator/regressor network sequentially consists of: convolutional layer-pooling layer-convolutional layer-pooling layer-convolutional layer-pooling layer-output layer, wherein the convolutional layer is one-dimensional convolution, the size of a convolution kernel is 1×5, the number of the convolutional kernels is within the range of 16-128, inclusive, the pooling layer is ½ downsampling, the output layers has 2 outputs, one of which outputs a result of the discriminator, namely the output of judging data authenticity, and the other outputs a result of the regressor, namely the quantitative analysis prediction value, except for the output layer, a nonlinear excitation function is leakyReLU, and nonlinear excitation of the output layer having two outputs is a sigmoid function.

4. The semi-supervised hyperspectral data quantitative analysis method based on the generative adversarial network as claimed in claim 1, wherein the loss function of the discriminator/regressor is the sum of three parts of the labeled sample loss function, the unlabeled sample loss function and the generated sample loss function, wherein the label sample loss function is a mean square error of the quantitative analysis prediction value of the labeled sample and the quantitative label value:

$$L_{supervised} = \|z_{label} - \hat{z}_{label}\|_2$$

the unlabeled sample loss function is a cross entropy of a discriminator prediction value and an authenticity label:

$$L_{unlabel\_real} = -0.5 * \sum_i y^i_{unlabel} \log(\hat{y}^i_{unlabel})$$

the generated sample loss function is a cross entropy of a discriminator prediction value and an authenticity label:

$$L_{unlabel\_fake} = -0.5 * \Sigma_i y^i_{fake} \log(\hat{y}^i_{fake}).$$

5. The semi-supervised hyperspectral data quantitative analysis method based on the generative adversarial network as claimed in claim 1, wherein the generator loss function is the sum of the loss function of the generated sample and the sample distribution matching loss function, wherein the loss function of the generated sample is the cross entropy of the prediction value of the generator generated sample by the discriminator and the authenticity label; and the loss function of the generated sample with respect to the generator is viewed as the inverse of the loss function of such generated sample with respect to the discriminator:

$$L'_{unlabel\_fake} = -\sum_i \tilde{y}^i_{fake} \log(\tilde{y}^i_{fake})$$

the sample distribution matching loss function is:

$$L_{distribution} = \|\hat{p}_{unlabel}(z) - \hat{p}_{fake}(z)\|_2$$

wherein $\hat{p}_{unlabel}(z)$ is the quantitative analysis value distribution of the unlabeled samples of an existing training batch predicted by the discriminator/regressor network, and $\hat{p}_{fake}(z)$ is the quantitative analysis value distribution of the generated samples of the existing training batch predicted by the discriminator/regressor network.

6. The semi-supervised hyperspectral data quantitative analysis method based on the generative adversarial network as claimed in claim 5, wherein the step of calculating the quantitative analysis value distribution of the unlabeled samples and the quantitative analysis value distribution of the generated samples are:

predicting the quantitative analysis values of the unlabeled samples and the generated samples of the existing training batch by the regressor, which are $\hat{z}_{unlabel}^i$ and $\hat{z}_{fake}^i$, respectively; and approximating the distribution of the sample quantitative analysis values to multinomial distribution of k items, approximating $\hat{z}_{unlabel}^i$ and $\hat{z}_{fake}^i$ to k levels, and then counting to obtain probability distribution $\hat{p}_{unlabel}(z)$ and $\hat{p}_{fake}(z)$.

* * * * *